Nov. 3, 1964     A. NEUMEIER ETAL     3,154,972
METHOD AND APPARATUS FOR FORMING A CHISEL TYPE CUTTER LINK
Filed May 15, 1961     4 Sheets-Sheet 1

INVENTORS.
Albert Neumeier
Russell B. Johnson
BY Robert J. Krause

Buckhorn, Cheatham & Blore
ATTORNEYS

Nov. 3, 1964     A. NEUMEIER ETAL     3,154,972
METHOD AND APPARATUS FOR FORMING A CHISEL TYPE CUTTER LINK
Filed May 15, 1961     4 Sheets-Sheet 2
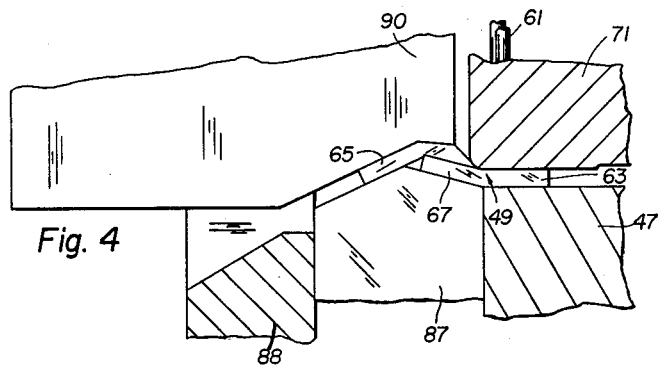
Fig. 4
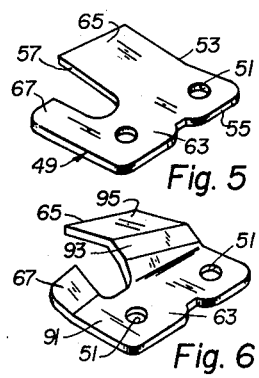
Fig. 5
Fig. 6
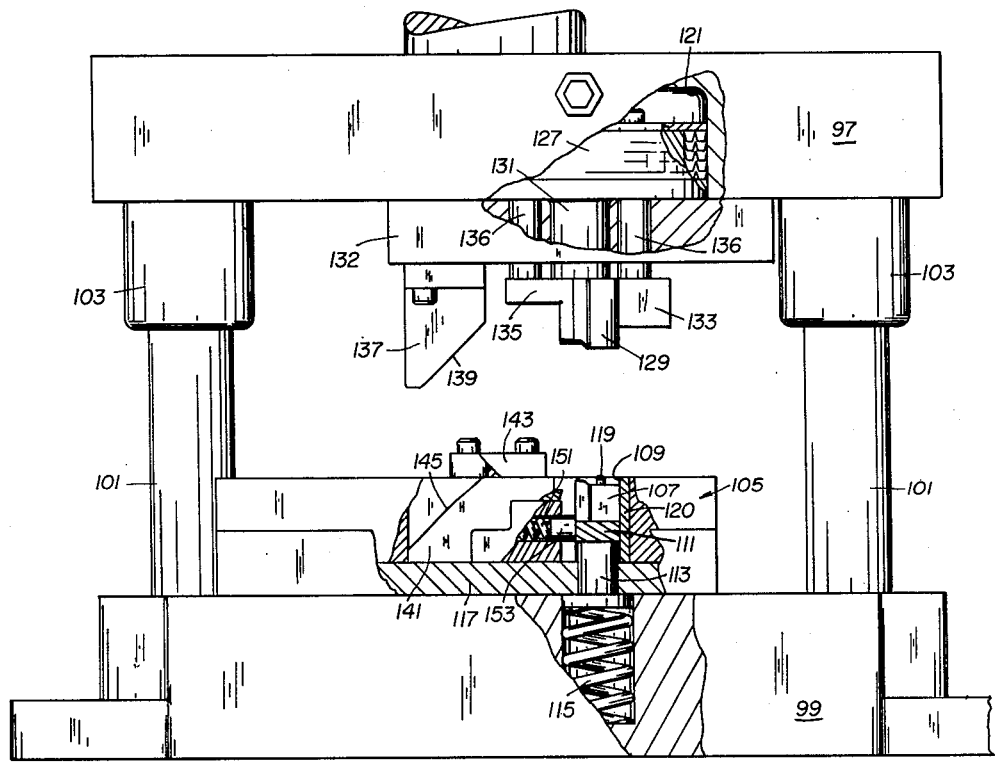
Fig. 7
Fig. 8
INVENTORS.
Albert Neumeier
Russell B. Johnson
Robert J. Krause
BY
Buckhorn, Cheatham & Blore
ATTORNEYS Nov. 3, 1964   A. NEUMEIER ETAL   3,154,972
METHOD AND APPARATUS FOR FORMING A CHISEL TYPE CUTTER LINK
Filed May 15, 1961   4 Sheets-Sheet 3
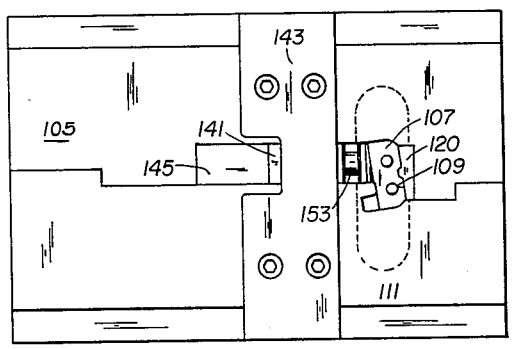
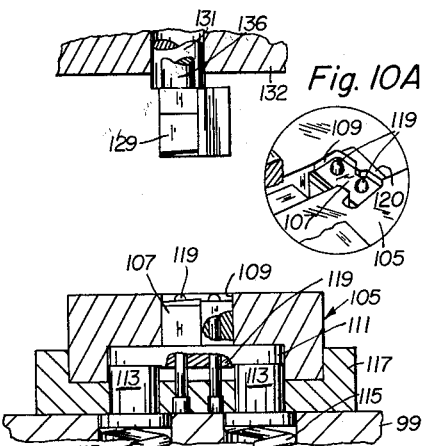
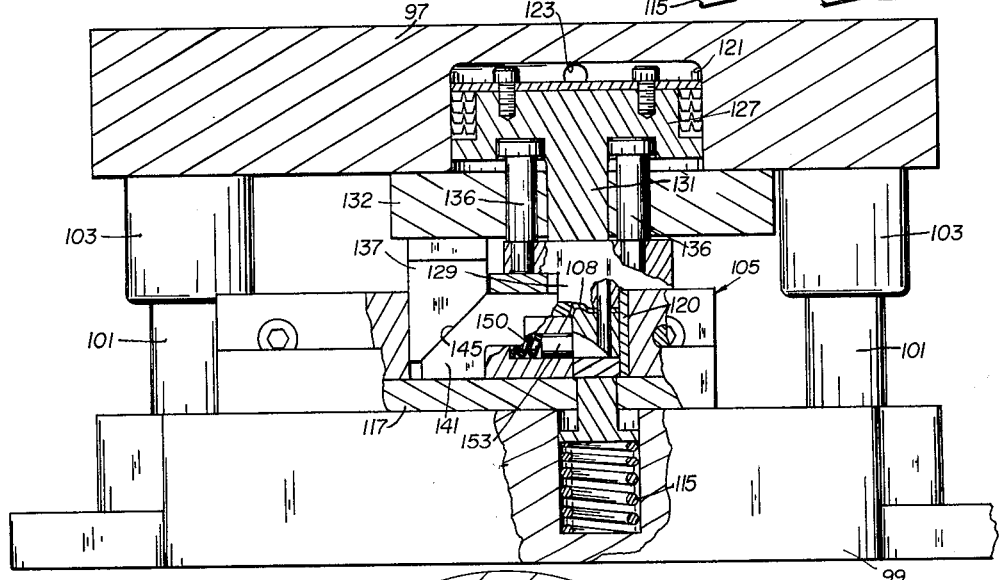
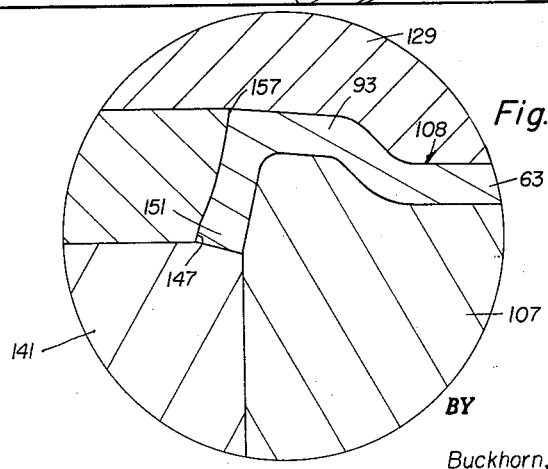
INVENTORS.
Albert Neumeier
Russell B. Johnson
Robert J. Krause
BY
Buckhorn, Cheatham & Blore
ATTORNEYS Nov. 3, 1964  A. NEUMEIER ETAL  3,154,972
METHOD AND APPARATUS FOR FORMING A CHISEL TYPE CUTTER LINK
Filed May 15, 1961  4 Sheets-Sheet 4

INVENTORS.
Albert Neumeier
Russell B. Johnson
BY  Robert J. Krause

Buckhorn, Cheatham & Blore
ATTORNEYS

United States Patent Office 3,154,972
Patented Nov. 3, 1964

3,154,972
METHOD AND APPARATUS FOR FORMING A
CHISEL TYPE CUTTER LINK
Albert Neumeier, Milwaukie, and Russell B. Johnson and
Robert J. Krause, Portland, Oreg., assignors to Omark
Industries, Inc., Portland, Oreg., a corporation of
Oregon
Filed May 15, 1961, Ser. No. 110,192
17 Claims. (Cl. 76—112)

The present invention relates to a method of and apparatus for forming a saw chain chisel-type cutter link and more particularly to a method and apparatus for producing from a sheet metal blank by a cold forming operation a saw chain link with a cutter portion having a substantially right angle bend with a sharp exterior corner.

Saw chains having such chisel-type cutter links are preferred by many saw chain users because of their smooth and rapid cutting action when properly sharpened. Heretofore chisel-type cutter links have been made by investment casting. Such casting is a costly and time consuming operation, resulting in a relatively high cost of production as compared with other types of cutter links which are cold formed from sheet metal blanks. Prior to the method of the present invention chisel-type cutter links could not be cold formed from blanks because of the necessity for forming a cutter element having the substantially right angle bend with a sharp exterior corner referred to above. Attempts in the past to cold form a chisel-type cutter element have involved a mere bending operation which resulted in a structural weakness at the right angle bend in the cutter element thus formed.

In accordance with the present invention the cutter portion of a sheet metal cutter link blank is first given a preliminary bending operation to bend the shank of the cutter portion to approximately its final position and to reversely bend the toe of the cutter portion with respect to the shank through an angle substantially less than a right angle, in order to condition the blank for a subsequent upsetting operation. In such upsetting operation the entire blank with the exception of the reversely bent toe of the cutter portion is backed up by being surrounded by metal walls fitting such blank and the metal of the toe is then upset by being forced to flow toward the shank into contact with other walls having the desired exterior shape of the toe including the substantially right angle bend with the sharp corner discussed above. Following subsequent grinding and sharpening operations to bring the cutter portion to final form, a resulting cutter link having high mechanical strength is produced at much less cost than by the prior casting methods.

While the method and apparatus of the present invention are particularly suited to the formation of a chisel-type cutter link having a sharp exterior corner they also have utility in making cutter teeth of the semi-chisel type having a smaller radius of curvature between the toe and shank of the cutter than can be produced by a bending operation alone.

It is therefore an object of the invention to provide a method for cold forming cutter links which heretofore could only be produced by a casting operation.

Another object of the invention is to provide a two-step method for cold forming chisel-type cutter links which will result in no structural weaknesses being present in the thus formed cutter links.

A further object of this invention is to provide a process and apparatus for producing chisel-type cutter links for saw chains in which such links are rapidly formed at low cost as compared to prior processes by an operation involving upsetting of the metal of the toe of the cutter portion of such links.

More particularly, the method and apparatus of the present invention includes forming chisel cutter links, exclusive of grinding, by first producing a partly formed blank in cutting and bending operation and then completing the forming of the cutter links in an upsetting operation. Metal stock is fed into a die cutting and bending machine wherein it goes through conventional cutter die operations comprising punching and cutting so as to form flat metal blanks having the necessary holes and general outlines of the finished cutter links prior to forming and grinding. Each flat metal blank is then fed into a gripper structure in such machine which structure grasps the body portion of the blank. A bending die then bends the cutter portion of the blank to bend the shank thereof out of the plane of such blank and to reversely bend the toe of the cutter portion at an angle to the shank which is substantially less than a right angle. The thus partially formed cutter link is then positioned in an upsetting die machine which upsets the toe portion of the cutter portion by forcing the metal thereof to flow into the desired shape. This latter machine includes a gripper structure which coact with the upsetting die to form the final configuration of the cutter link prior to grinding.

In the upsetting operation the walls of the gripper structure completely surround and back up the body portion and the shank of the cutter portion of the blank, leaving the toe of the cutter portion unsupported and projecting from the gripper structure into the upsetting die. Guide rods which correctly position the blank within the gripper structure also completely fill the pivot holes in the body portion of the blank. The upsetting die includes an upsetting plunger which is forced against the end of the exposed extending toe of the cutter portion of the blank causing the metal therein to be upset. The end of such plunger and the walls of the upsetting die define a cavity corresponding to the desired shape of the toe of the cutter portion so that such toe and the adjacent end of the shank of the cutter portion are upset into the final form of the cutter portion except for grinding.

In the upsetting operation above described, the movement of the upsetting plunger is such that the upsetting force is applied in a direction having a major component parallel to the plane of the body portion of the cutter blank and also a major component parallel to the plane of the partly formed toe of the cutter portion. The upsetting plunger makes initial contact with the edge of such toe which is remote from the gripper structure and causes the metal thereof to flow toward the shank of the cutter portion and conform to the interior of the upsetting die.

Various other objects of the present invention will be apparent from the following detailed description thereof given in connection with the accompanying drawings, which show the apparatus of the present invention by which the steps of the present method may be carried out, and of which:

FIG. 4 is a fragmentary vertical sectional view on an enlarged scale of the bending die of FIG. 1 in closed position with the partly formed blank in position therein and held by associated gripper elements.

FIG. 5 is a perspective view of the flat metal cutter link blank prior to the bending operation carried out in the die of FIGS. 1 to 4;

FIG. 6 is a perspective view of the cutter link blank after the bending operation carried out in the die of FIGS. 1 to 4;

FIG. 7 is a side elevation of the upsetting die and its associated gripper structure with parts broken away to show internal structure;

FIG. 8 is a fragmentary bottom view of the upper portion of the die of FIG. 7;

FIG. 9 is a plan view of the lower portion of the die of FIG. 7;

FIG. 10 is a fragmentary vertical cross section on an enlarged scale of the upper and lower gripper structure of the die of FIGS. 7 to 9 in open position with internal parts shown in elevation and in part broken away to show internal structure;

FIG. 10A is an insert view on an enlarged scale showing the lower gripper socket and positioning guide rods in perspective;

FIG. 11 is a view partly in section and otherwise similar to FIG. 7 showing the upsetting die and its gripper structure in closed position about the finally formed link;

FIG. 11A is a sectional view of a portion of FIG. 11 on an enlarged scale showing portions of the upsetting and gripper elements;

Figure 1:
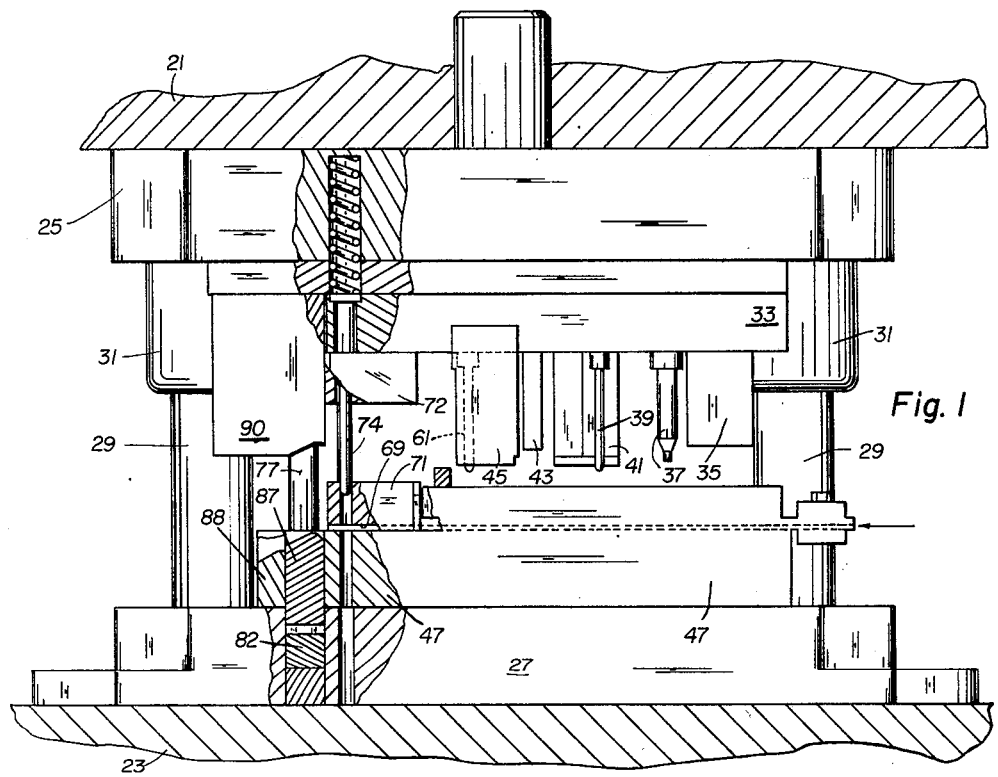
FIG. 1 is a side elevation of a cutting and bending die assembly for cutting out and partly forming a chisel bit cutter with parts broken away to show internal structure and with the die structure mounted between the platen and plunger of a press, such platen and plunger being shown in cross section.

Referring to the accompanying drawings, FIG. 1 shows a cutting and bending die assembly in accordance with the present invention mounted between the plunger 21 and platen 23 of a suitable press. The die assembly includes an upper support member 25 secured to the plunger 21 of the press and a lower support member 27, such support members being guided for movement toward and away from each other while being maintained in proper registry by vertically extending guide members 29 carried by the lower support member 27 and slidably received in sockets in complementary guide members 31 carried by the upper support member 25. The plunger 21 of the press is reciprocated vertically to intermittently force the upper support member 25 of the die assembly toward the lower support member 27 to close the cutting and bending dies and to again raise the upper support member to open such dies. The upper support member 25 carries an upper die plate assembly 33 to which are secured a stamping die member 35, a pair of punches 37, a pair of aligning pins 39, a side trimming cutter element 41, a metal smoothing element 43 and a cutting off cutter element 45 all cooperating with suitably formed element (not shown) on a lower die plate 47 to punch holes in and cut out a cutter link blank 49 such as shown in FIG. 5.

Metal stock in the form of a sheet metal strip is fed over the lower die plate 47 a predetermined distance into the right end of the die assembly in FIG. 1, each time the plunger 21 is moved upwardly to open the dies. Such strip is first flattened by the stamping die member 35 and during the next reciprocation of the press plunger 21 the holes 51 shown in FIGS. 5 and 6 are punched by a pair of punches 37 in the portion of the metal strip which will form the cutter blank 49. The aligning pins 39 (FIG. 1) enter such holes on the next reciprocation of the press plunger 21 as the strip is advanced in order to hold the metal strip in correct position to have further holes 51 punched therein and to be trimmed by the cutting element 41. Such element 41 trims the sides of the metal stock into the edge outline shown at 53 in FIG. 5 on the next reciprocation of the press plunger 21. The metal stock is then smoothed around the punched holes 51 by the smoothing member 43 of FIG. 1 on the next reciprocation of the press plunger 21. The cutter element 45 then cuts off a cutter link blank 49 by cutting a section out of the strip on the next reciprocation of the plunger 21 to thereby form the bottom edge 55 (FIG. 5) of the cutter link blank and the upper edge 57 of the next succeeding cutter link blank. Aligning pins 61 also carried by the upper die plate assembly 33 enter the holes 51 of FIG. 5 to hold the blank being cut off in position during such cutting operation. The result is a flat metal cutter link blank 49 having a body portion 63, a cutter portion 65 and a depth gauge portion 67. The cutting and punching operations just described are similar to those employed commercially from other types of cutter link blanks and need not be further described.

Figure 2:
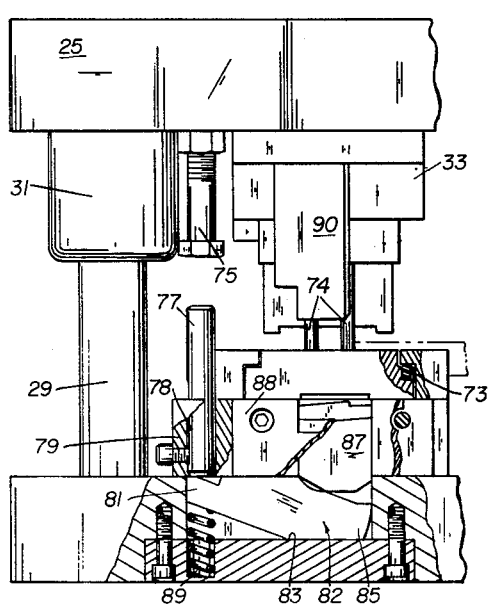
FIG. 2 is a fragmentary end elevation of the bending die of FIG. 1 with parts broken away and showing the bending die in open position and also showing the plunger and rocker arm assembly utilized in actuating such die.

The flat metal cutter link blank 49 produced as above described is pushed by the advancing strip into a laterally extending recess 69 in the lower portion of a gripper member 71 shown in FIG. 1 so that the blank is positioned in a slot between such member 71 and the upper surface of the lower die plate 47. The gripper member 71 is spring pressed downwardly by springs 73, one of which is shown in FIG. 2, to hold the blank 49 against such upper surface of the die plate 47. During the next downward reciprocation of the press plunger 21 of the gripper member 71 is pressed against the blank by the block 72 forming part of the upper die structure. Downward reciprocation of the press plunger 21 also causes another pair of aligning pins 74 to enter the holes 51 (FIG. 5) in the blank 49 to properly position such blank for a bending operation, such aligning pins passing through holes in the gripper member 71. The bending operation partly forms the cutter portion 65 of the blank as well as completely forming the depth gauge portion 67, to thus partly form the blank.

Figure 3:
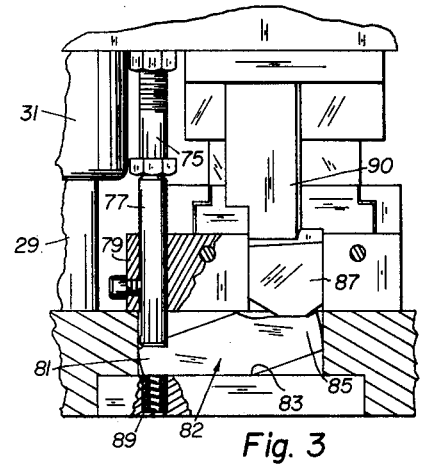
FIG. 3 is a fragmentary view similar to FIG. 2 showing a portion of the structure of FIG. 2 with the bending die in closed position.

The upper support member 25 carries a ram 75 which is positioned to engage a plunger 77 slidable in a bore 78 in a guide member 79 secured to the lower die plate 47. When the blank is correctly positioned below the gripper member 71, a downward reciprocation of the press plunger 21 moves the ram 75 downwardly against the plunger 77. The plunger 77 in turn engages an end 81 of a rocker arm 82 positioned in a recess in the lower support member 27, causing the rocker arm to pivot about a pivot point 83 thereon, thus forcing the upper surface of the other end 85 of the rocker arm 82 upwardly. A lower bending die member 87 is mounted for upward sliding movement between an end of the lower die plate 47 and a guide member 88 and is engaged by the end 85 of the rocker arm 82 so as to be moved upwardly. As the plunger 77 forces the end 81 of the rocker arm 82 downwardly, a spring 89 under such end is compressed. When the plunger is released the spring 89 forces the end 81 of the rocker arm 82 upwardly, thus causing the end 85 of the rocker arm to lower the lower bending die member 87. At the same time as the lower bending die member 87 is moved upwardly, an upper bending die member 90 carried by the upper die plate assembly 33 is moved downwardly by the downward reciprocation of the press plunger 21. FIG. 2 illustrates the bending die in open position with the upper bending die member 90 in raised position and the lower bending die member 87 in its lower position, and FIG. 3 illustrates the bending die in closed position with the upper and lower bending die members 90 and 87 adjacent each other.

FIG. 4 shows the bending die members 87 and 90 in contact with the metal blank 49 after it has been bent into its intermediate form 91 illustrated by FIG. 6. At this stage the metal blank has been converted into a partially formed cutter link consisting of a completely formed depth gauge portion 67 bent out of the plane of the body portion 63, and a partially formed cutter portion 65 having a shank portion 93 and a partially formed toe portion 95. At this stage the toe portion 95 of the cutter link blank is bent at an angle with respect to the shank portion 93 which is substantially less than a right angle. The angle thus formed is approximately one-half of the final angle of the toe portion with respect to the shank portion of the final cutter link.

The partly formed blank 91 is then transferred to the upsetting die structure illustrated in FIGS. 7 to 14. Such upsetting die structure has an upper support member 97 adapted to be secured to a press plunger similar to the plunger 21 of FIG. 1 and a lower support member 99 adapted to be secured to a press platen, such as the platen 23 of such figure. The lower support member 99 has upwardly extending guide members 101 slidably received in sockets in corresponding guide members 103 carried by the upper support member 97 to guide the support members during vertical reciprocation of the upper support member. The lower support member has secured thereto a lower die plate assembly 105 in which is mounted a lower gripper structure including a lower gripper member 107 mounted for vertical reciprocation in a socket 109 in the plate assembly 105.

As shown most clearly in FIG. 10, the downward motion of the lower gripper member 107 is limited by the cross piece 111 engaging the plate 117. A pair of guide pins 119 held in bores in the plate 117 and having their lower ends resting on the support member 99 extend upwardly through bores in the central portion of the cross piece 111 and aligned bores in the gripper member 107. The upper ends of such guide pins project slightly above such member in the uppermost portion of such member.

The partly formed blank 91 of FIG. 6 is placed in the socket 109 of the lower gripper structure so as to rest upon the lower gripper member 107. Such gripper member 107 has an upper surface fitting one surface of the completely formed blank 108 of FIG. 16. Such surface of the gripper member also fits the lower surface of the body portion 63, and shank portion 93 of the partly formed blank 91 in the position of such blank in FIG. 6. The blank 91 is properly located in the socket 109 by the walls of the socket including the wall provided by a vertically extending backing plate 120 and the pins 119 extend into and fill the holes 51 in the blank.

Figure 15:
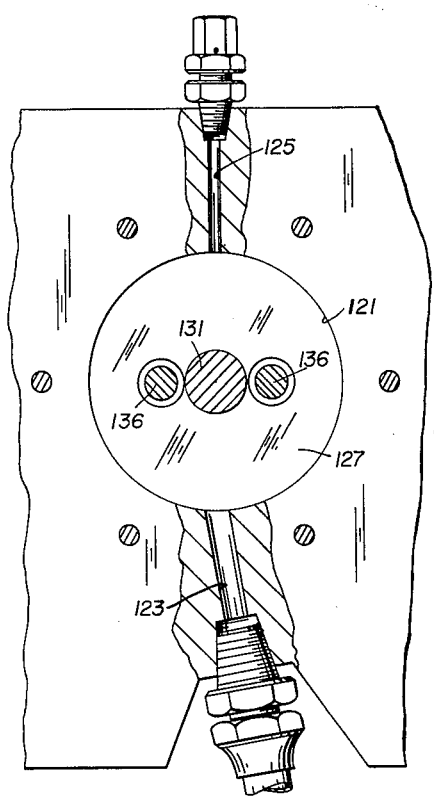
FIG. 15 is a bottom view of the hydraulic cylinder and piston of FIG. 14 with certain parts shown in cross section and other parts broken away to show the hydraulic intake and bleeder valve passage for the hydraulic cylinder.

The upper die support member 97 has a hydraulic cylinder 121 therein provided with an inlet port 123 (FIGS. 14 and 15) for hydraulic fluid under pressure and a bleeder port 125 for enabling air to be bled from the hydraulic system. A piston 127 is positioned in the cylinder 121 and is vertically reciprocable therein. Hydraulic fluid under pressure, entering the hydraulic cylinder 121 through the port 123 normally holds the piston 127 in its lowermost position shown in FIG. 7. An upper gripper member 129 is secured to a piston rod 131 extending downwardly from the piston 127 through a bore in an upper die plate 132 secured to the upper support member 97. The upper gripper die member 129 has a lower surface on its central portion fitting the upper surface of the body portion 63 and the shank portion 93 of the blank 91 of the partly formed blank of FIG. 6. Such gripper die member has laterally extending portions 133 and 135 (FIGS. 8 and 12) secured to guide rods 136 sliding in bores in the die plate 132 to maintain the upper die member 129 properly oriented.

Figure 12:
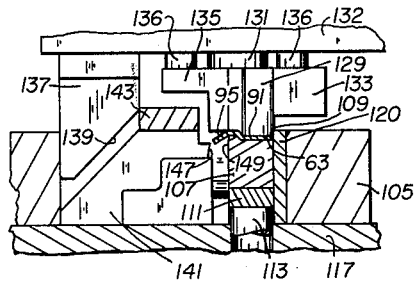
FIG. 12 is a fragmentary vertical sectional view of the upsetting die of FIGS. 7 to 11 showing the upper gripper element in its position of initial contact with the partly formed link blank.

An upsetting die operating plunger 137 having a lower inclined cam surface 139 is rigidly secured to the lower surface of the die plate 132. Initially the plunger 137 and the upper gripper die member 129 move downward simultaneously, until the upper gripper die member engages the blank 91 of FIG. 6 which has been positioned in the socket 109 as shown in FIG. 12 and moves such blank downwardly to the position shown in FIG. 13. During such downward movement of the blank 91 the lower gripper die member 107 moves downwardly to compress the springs 115 (FIGS. 10 and 11) until the cross piece 111 carrying the lower gripper die member 107 bottoms on the stationary plate 117. Stopping of the lower gripper die member 107 also stops the upper gripper die member 129 while the upsetting die operating plunger 137 continues downwardly. This is possible since hydraulic fluid can be forced back out of the cylinder 121 through the inlet port 123 into a source of hydraulic fluid under pressure so that the hydraulic cylinder 121 and piston 127 are the equivalent of a heavy spring requiring a smaller space in the die structure than could be occupied by a compression spring of equal force.

The lower die structure also includes a horizontally reciprocable upsetting die plunger 141 made up of two parts suitably secured together and guided for reciprocation in a slot in 105 and on the plate 117 by a guide member 143 secured to the upper surface of the lower die plate assembly 105. Such die plunger has an inclined cam surface 145 which is engaged by the cam surface 139 on the die operating plunger 137 to drive the die plunger 141 to the right in FIG. 7 to the position shown in FIG. 11 as the die operating plunger 137 continues downwardly.

Figure 13:
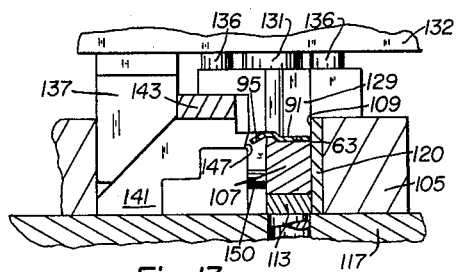
FIG. 13 is a view similar to FIG. 12 showing the upper gripper element in its lowermost position and with the horizontal plunger of the upsetting die in position to contact the edge of the projecting toe of the partly formed cutter link.
Figure 14:
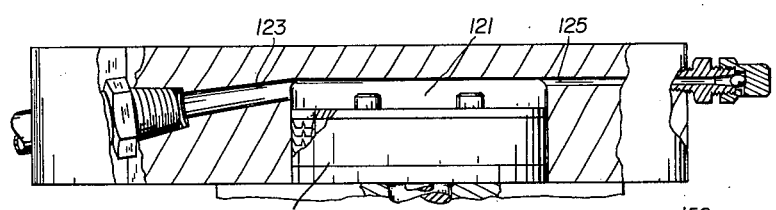
FIG. 14 is a fragmentary sectional view showing the hydraulic cylinder and piston for the gripper structure of FIGS. 7 to 13.

As shown in FIGS. 12 and 13, the toe portion 95 of the cutter portion of the blank 91 projects from the gripper structure including the lower gripper member 107 and the upper gripper member 129. The die plunger 141 has a notch 147 which is in position to engage the edge of the toe portion 95 remote from the gripper structure when the upper and lower gripper members 129 and 107 respectively reach the position shown in FIG. 13. Continued downward movement of the die operating plunger 137 cams the die plunger 141 to the right in FIG. 13 and forces the notch 147 into engagement with the free end of the toe portion 95 of the blank to exert an upsetting force thereon. Such force is in a plane substantially parallel to the plane of the body portion 63 of the blank 91. However, a substantial force component lies in the plane of the projecting toe portion 95 of the blank as is apparent from FIG. 13.

The walls of the gripper structure including the socket 109 and the surfaces of the gripper members 107 and 129 completely enclose the blank 91 except for the toe portion 95. The shape of the end of the upsetting die plunger 141 including the notch 147 and the exposed wall 149 of the lower gripper member 107 result in a cavity, when the upsetting die is closed, which corresponds to the shape of the formed toe portion 151 of the completely formed blank 108 of FIGS. 11 and 16. The force applied through the die plunger 141 is sufficient to cause the metal of the toe portion to flow to the form shown in FIGS. 11 and 16.

Upon upward movement of the die operating plunger 137 such plunger releases the upsetting die plunger 141. A compression spring 150 (FIG. 11) contained in a bore in the plunger 141 and engaging a spring plunger 153 bearing against the lower gripper member 107 forces the upsetting die plunger to the left in FIG. 11 to disengage such plunger from the formed cutter link. The upper gripper member 129 is thereafter raised to disengage such member from the upper surface of the formed cutter link 108, thus permitting the springs 115 to cause the lower gripper member 107 to raise the formed cutter link in the lower gripper die socket so that such link can be removed.

Figure 16:
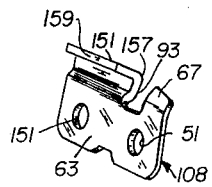
FIG. 16 is a perspective view of the completed formed chisel-type cutter link prior to grinding produced by the method and apparatus of FIG. 7 of the present invention.

As stated above the completed chisel cutter link 108, except for grinding is shown in FIG. 16. Such link has a flat body portion 63, a bent depth gauge portion 67 and a cutter portion having a shank portion 93 and an upset toe portion 151 formed by upsetting the bent toe portion 95 of the blank of FIG. 6. The cutter portion of the cutter link 108 of FIG. 16 has a substantially right angle bend between the shank portion 93 and the toe portion 151 with a sharp exterior edge 157. The cutter link is brought to final form by grinding the outer surface of the toe portion to make it thinner along its longitudinal edge 159 and by grinding the edges of the shank portion 93 and toe portion 151 which are directed toward the depth gauge 67 with a suitably shaped wheel in order to sharpen such edges.

In carrying out the method of the present invention the flat blank 49 of FIG. 5 is first produced in the die structure of FIGS. 1 to 4 by feeding a strip of metal step by step through such structure. The upper die structure is reciprocated downwardly between each feeding step. Holes 51 are punched in such strip by the punches 37 and then the side of the strip is trimmed to provide the side edge 53 of the blank 49 by a cutter die element 41 while the strip is held in aligned position by the aligning pins 39 entering previously punched holes 51 in the strip. The cutter blank 49 is then cut off by a die element 45 which simultaneously forms the bottom edge 55 of the blank and also the upper edge 57 so as to provide the body portion 63, cutter portion 65 and depth gauge portion 67 of the blank 49.

The advancing strip pushes the blank 49 into the recess 69 below a gripper member 71. Aligning pins 74 enter the holes 51 in such blank and the gripper member 71 is pressed against the blank by the block 72 carried by the upper die structure. The cutter portion 65 and the depth gauge portion 67 of the blank project from the gripper structure, of which the gripper member 71 is a part, into position to be engaged by the upper bending die member 90 and the lower bending die member 87. Such upper bending die member 90 is moved downwardly into engagement with the cutter portion 65 and depth gauge portion 67 of the blank and simultaneously the lower bending die member 87 is moved upwardly into engagement with such portions by a ram 75 carried by the upper die structure actuating a rocker arm 82 through a plunger 77 slidable in the guide member 79 forming part of the lower die structure. The two die members 90 and 87 bend the depth gauge portion 67 into the final form shown in FIG. 6 and also partly bend the cutter portion into the form shown in such figure so that the shank portion 93 is bent out of the plane of the body portion 63 and at an angle thereto and the toe portion 95 is merely bent with respect to the shank portion 93 through an angle substantially less than a right angle. Upward reciprocation of the upper die structure releases the partly formed blank 91 and it is ejected from the die by the next feeding operation of the strip referred to above.

The partly formed blank is then positioned in the socket 109 of the gripper portion of the upsetting die structure of FIGS. 7 to 15. It is received on the upper surface of the lower gripper member 107 and aligned thereon by the aligning pins 119. The upper gripper member 129 is moved downwardly by a reciprocation of the upper die structure and engages the upper surface of the blank 91 as shown in FIG. 13. The blank 91 and the two gripper members 107 and 129 then move downwardly in the socket 109 until the cross member 111 engages the plate 117. This is the position of FIG. 13 and continued downward movement of the upper die structure causes the fluid pressure in the cylinder 121 (FIG. 11) to be applied through the upper gripper member 129 to the blank 91. In the position shown in FIG. 13, the surfaces of all portions of the blank except the projecting toe portion 95 are backed up by conforming metal walls including the inner surfaces of the holes 51 in the blank.

After the die parts reach the position of FIG. 13, continued downward movement of the upper die structure causes the upsetting die operating plunger 137 to cam the upsetting die plunger to the right in FIGS. 13 and 11 to upset the toe portion 95 of the blank 91 into the shape shown in FIGS. 11 and 16 in which the upset toe portion 151 is thickened and has a substantially right angle bend with respect to the shank portion 93 with a sharp exterior corner 157. The walls provided by the notch in the upsetting plunger 141 and the gripper members 129 and 107 define a cavity which has the final shape of the toe portion 151 and the metal is caused to flow into such shape by an upsetting force applied substantially in the plane of the body portion 63 of the blank which force has a component in the plane of the toe portion both before and after the upsetting operation.

As is apparent from the above description the method of this invention involves a two-step process in which the cutter portion of a previously cut out flat metal blank is first partly formed by a bending operation and the partly formed cutter portion is then completely formed by an upsetting operation.

We claim:

1. The method of cold forming a saw chain cutter link with a cutter portion including a toe portion and a shank portion forming a substantially right angle bend with a sharp exterior corner, comprising the steps of first forming a flat metal blank having a body portion and a cutter portion protruding from an edge of said body portion, then partially bending the toe portion relative to the shank portion of the cutter portion to substantially one half the final cutter portion angle, then upsetting said cutter portion to increase the thickness of the corner portion resulting from the said partial bending step and to form the final cutter portion angle bend with a sharper exterior corner, then grinding a cutting edge on such portion than that resulting from said partial bending.

2. In the method of cold forming a saw chain cutter link with a cutter portion having a shank portion and a toe portion forming a substantially right angle bend with a sharp exterior corner, the steps of inserting a body portion of a flat metal cutter blank having a cutter portion projecting forward of said body portion securely between gripper members so that the cutter portion projects therefrom, striking a blow to said cutter portion with a bending die, said blow partially bending said cutter blank into its final form, then inserting said partially formed blank securely between gripper members leaving only the toe portion of said partially formed cutter portion unsupported, then striking said toe portion a blow with a die member, said blow being parallel to the plane of said body portion and having a substantial force component in the plane of said partially formed toe portion of said cutter portion, said blow being of a magnitude sufficient to upset said toe portion of said cutter portion into the final form of said cutter link except for final grinding operations.

3. The method of cold forming a saw chain cutter link with a cutter portion having a shank portion and a toe portion forming a substantially right angle bend with a sharp exterior corner, said method comprising the steps of forming a flat metal cutter blank having the final shape of the body portion of said cutter link, and then partially forming said cutter link by an initial blow with a bending die which completely forms the offset shank portion of said cutter portion and partially forms the toe portion of said cutter portion by bending said toe portion to substantially one half the final cutter portion angle, transferring said partially formed blank to an upsetting die and then surrounding said body portion and shank portion completely with a metal in a gripper die structure leaving only said toe portion exposed, then finally forming said cutter link by upsetting said exposed toe portion by means of a die member having substantial force component in the plane of said toe portion and against the end of said toe portion most remote from said gripper die structure, the force of said die member being of a magnitude sufficient to upset said toe portion so as to form a substantially right angle bend in said cutter portion, said bend having a sharp exterior corner.

4. In the method of cold forming a saw chain chisel type cutter link, the step of taking a partially formed cutter link blank comprising a completely formed body portion and a partially bent cutter portion having a completely formed shank portion and a partially formed toe portion, inserting said blank in a gripper die structure so that only said toe portion is not surrounded by die metal, and then striking a blow with a movable upsetting die member to said toe portion, said die member having a substantial force component in the plane of said toe portion and striking the edge of said toe portion most remote from said gripper die structure, said blow being of a magnitude sufficient to upset the metal of said toe portion so as to form a substantially right angle bend with a sharp exterior corner in said cutter portion of the cutter link.

5. Apparatus for cold forming a saw chain cutter link having a shank portion and a toe portion forming a substantially right angle bend with a sharp exterior corner, said apparatus comprising a bending die and an upsetting die, said bending die comprising a gripper member for securely gripping the body portion of a flat metal cutter blank, a lower bending die member and an upper bending die member to bend the cutter portion of said cutter blank to substantially one half its final angle, and means to simultaneously bring said upper and lower bending die members into forceful contact with said cutter portion so as to accomplish the initial bending operation, means to transfer the partially formed cutter blank to an upsetting die, said upsetting die comprising a lower gripper die having a socket therein to receive the partially formed cutter blank body and shank portion, and an upper gripper die member, said lower and upper gripper die members when placed together defining a cavity conforming to the shape of the partially formed cutter blank body and shank portion, an upsetting die member reciprocally movable in one plane only with a notch in one edge thereof having the final shape of the toe portion to be upset, and means to bring the upper and lower members into secure contact with said body and shank portions of said partially formed cutter blank and rigidly grip said cutter blank during the upsetting operation, means to forcefully move said upsetting die member against the leading edge of the projecting toe portion of said cutter blank so as to cause the metal of said toe portion to upset into the final cutter link form exclusive of grinding operations, and means to thereafter release said upset cutter link blank from said upsetting die.

6. In the method of cold forming a saw chain chisel type cutter link, the step of taking a partially formed cutter link blank comprising a completely formed body portion and a partially bent cutter portion having a completely formed shank portion and a partially formed toe portion, inserting said blank in a gripper die structure so that only said toe portion is not surrounded by die metal, and then striking a blow with a movable upsetting die member to said toe portion, said die member having a substantial force component in the plane of said toe portion and striking the edge of said toe portion most remote from said gripper die structure, said blow being in a plane parallel to the plane of said plate portion and having a substantial force component in the longitudinal plane of said protrusion.

7. In the method of cold forming a saw chain chisel type cutter link, the step of taking a partially formed cutter link blank comprising a completely formed body portion and a partially bent cutter portion having a completely formed shank portion and a partially formed toe portion, inserting said blank in a gripper die structure so that only said toe portion is not surrounded by die metal, and then striking a blow with a movable upsetting die member to said toe portion, said die member having a substantial force component in the plane of said toe portion and striking the edge of said toe portion most remote from said gripper die structure, and blow being in a plane parallel to the plane of said plate portion and said blow having a substantial force component in the longitudinal plane of said protrusion and another force component normal to the longitudinal plane of said protrusion.

8. In the method of cold forming a saw chain chisel type cutter link, the step of taking a partially formed cutter link blank comprising a completely formed body portion and a partially bent cutter portion having a completely formed shank portion and a partially formed toe portion comprising an angular protrusion with respect to said shank portion with the angle between said protrusion and said shank being less than the angle between the toe and shank of a chisel type cutter link, inserting said blank in a gripper die structure so that only said toe portion is not surrounded by die metal, and then striking a blow with a movable upsetting die member to said toe portion, said die member having a substantial force component in the plane of said toe portion and striking the edge of said toe portion most remote from said gripper die structure, said blow being of a magnitude sufficient to upset the metal of said toe portion so as to form a substantially right angle bend with a sharp exterior corner in said cutter portion of the cutter link.

9. In the method of cold forming a saw chain chisel type cutter link, the step of taking a partially formed cutter link blank comprising a completely formed body portion and a partially bent cutter portion having a completely formed shank portion and a partially formed toe portion comprising an angular protrusion with respect to said shank portion with the angle between said protrusion and said shank being substantially one half the angle between the toe and shank of a chisel type cutter link, inserting said blank in a gripper die structure so that only said toe portion is not surrounded by die metal, and then striking a blow with a movable upsetting die member to said toe portion, said die member having a substantial force component in the plane of said toe portion and striking the edge of said toe portion most remote from said gripper die structure, said blow being of a magnitude sufficient to upset the metal of said toe portion so as to form a substantially right angle bend with a sharp exterior corner in said cutter portion of the cutter link.

10. The method of cold forming a saw chain chisel type cutter link having a cutter portion including a shank portion and a toe portion extending substantially at a right angle from said shank portion, said method comprising the steps of forming a flat metal blank workpiece, said workpiece having the metal content and outline of said cutter link except for forming and grinding operations thereon, then placing the body portion of said workpiece in gripper dies and partially forming the cutter portion by an initial blow from a plunger die, said blow being of a magnitude sufficient to completely form the shank of said cutter portion, said blow simultaneously forming an angular protrusion with respect to said shank, said angle being substantially one half the angle between toe and shank of chisel type cutter link, said protrusion being the partially formed toe of said cutter portion, then placing said workpiece in a gripper die which completely backs up and secures said plate and shank portion leaving only said protrusion exposed, filling completely the plate link holes with guide rods which position said workpiece within said gripper die, then striking a blow with another plunger die to said exposed protrusion, said plunger die making initial contact with said protrusion at the leading edge of said protrusion, said blow being in a plane substantially parallel to the longitudinal plane of said plate portion but with a substantial force component in the longitudinal plane of said protrusion and with another less substantial force component substantially normal to the longitudinal plane of said protrusion, said blow being of sufficient magnitude to upset the metal of said protrusion so as to form the final angle of the toe with respect to said shank.

11. Apparatus for cold forming a saw chain chisel type cutter link having a body portion and a cutter portion including a shank portion and a toe portion, said apparatus comprising a gripper die means to securely grip the body portion of a flat metal blank workpiece, plunger die means to form the shank portion of said link into final shape while said body portion is securely held by said gripper die, said plunger die simultaneously forming a protrusion adjacent said shank, said protrusion being bent with respect to said shank, said protrusion being the partially formed toe of said cutter portion, means to insert said workpiece into another gripper die, said workpiece being the partially formed cutter link, said gripper die surrounding and securely gripping said body and shank portions, guide rods to position said blank properly within said gripper die means by penetrating and filling holes in said body portion, and plunger die means to deliver a final blow to said protrusion in a direction substantially longitudinal of said body portion, said blow having a substantial force component longitudinal of said protrusion, said plunger die block being movable in a plane substantially parallel to the plane of said body portion, said plunger die being actuated by a plunger ram wedge adjacent a corresponding rear surface on said plunger die block, said plunger ram wedge being actuated by a hydraulic cylinder and piston assembly.

12. Apparatus for cold forming a saw chain chisel type cutter link having a body portion and a cutter portion including a shank portion and a toe portion, said apparatus comprising a gripper die for surrounding and securely gripping the body portion and the shank portion of a partially formed cutter link blank, said cutter link blank also having link holes in said body portion and having a protrusion bent with respect to said shank portion, said protrusion being the partially formed toe of the cutter portion of said cutter link, pilot rod means to position said blank properly within said gripper die means and to fill said link holes in said body portion, and plunger die means to deliver a final blow to said protrusion in a direction lateral to said body portion, said blow having a substantial force component normal to the lateral direction of said protrusion, said plunger die means being movable in a plane substantially parallel to the plane of said body portion, said plunger die means being actuated by a wedge-shaped ram adjacent a corresponding wedge-shaped surface on said plunger die, said wedge-shaped ram being actuated by a hydraulic cylinder pushing against a surface opposite said wedge-shaped surface.

13. The method of cold-forming a saw chain cutter link having a body portion and a cutter portion with a bent shank portion and a toe portion extending at a substantially right angle to said shank portion, said method comprising the steps of first forming a flat metal cutter blank having said body portion and a protruding portion for providing said shank and toe portion, then bending said protruding portion to bend said shank portion to its final position with respect to said body portion and simultaneously partially bending said toe portion with respect to said shank portion to substantially one-half said angle, then surrounding said body portion and said shank portion in a gripper die structure leaving only said toe portion exposed, then upsetting said exposed toe portion by applying a force against the edge of said partially bent toe portion most remote from said body portion, said force having a substantial force component in the plane of said toe portion, said force being of a magnitude sufficient to upset said toe portion so as to form said substantially right angle.

14. In the method of cold-forming a saw chain cutter link with a cutter portion having a substantially right angle bend between a toe portion and a shank portion of said cutter portions, the steps of inserting a partially formed cutter link blank comprising a completely formed body portion and a partially bent cutter portion having a completely formed shank portion and a partially formed toe portion into a gripper die structure surrounding said partially formed cutter blank except said toe portion, and then upsetting said toe portion by applying a force against the edge of said partially formed toe portion most remote from said gripper die structure, said force having a substantial component in the plane of said toe portion, said force being of a magnitude sufficient to upset the metal of said toe portion to form said substantially right angle bend at the junction between said toe and shank portions.

15. The method of cold forming a saw chain cutter link with a body portion and a cutter portion, including an offset shank portion and a straight toe portion, said shank portion and said toe portion forming a substantially right angle bend with a sharp exterior corner, said method comprising the steps of first forming a flat metal blank having a body portion and a cutter portion protruding from an edge of said body portion, then partially forming said cutter portion by completely bending said offset shank portion relative to said body portion and simultaneously partially bending said toe portion relative to said shank portion to substantially one-half the final cutter portion angle, then upsetting the partially formed toe portion so as to form the final cutter portion angle with a sharp exterior corner by applying a force against the edge of said partially formed toe portion most remote from said body portion and simultaneously supporting said shank portion against further deformation, said force having a substantial force component in the plane of said toe portion, and then grinding a cutting edge on said toe portion.

16. In the method of cold forming a saw chain cutter link with a cutter portion including a bent shank portion and a straight toe portion extending at a substantially right angle, the steps of inserting a body portion of a flat metal cutter blank having a cutter portion projecting forward of said body portion securely between gripper members so that the cutter portion projects therefrom, striking a blow to said cutter portion with a bending die, said blow partially bending said cutter blank into its final form, then inserting said partially formed blank securely between gripper members leaving only the toe portion of said partially formed cutter portion unsupported, then striking said toe portion a blow with a die member, said blow being parallel to the plane of said body portion and having a substantial force component in the plane of said partially formed toe portion of said cutter portion, said blow being of a magnitude sufficient to upset said toe portion of said cutter portion into the final form of said cutter link except for final grinding operations.

17. The method of cold forming a saw chain cutter link having a body portion and a cutter portion with a bent shank portion and a toe portion extending at a substantially right angle to said shank portion, said method comprising the steps of forming a flat metal cutter blank having the final shape of the body portion of said cutter link, and then partially forming said cutter link by an initial blow with a bending die which completely forms the offset shank portion of said cutter portion and partially forms the toe portion of said cutter portion by bending said toe portion to substantially one-half the final cutter portion angle, transferring said partially formed blank to an upsetting die and then surrounding said body portion and shank portion completely with metal in a gripper die structure leaving only said toe portion exposed, then finally forming said cutter link by upsetting said exposed toe portion by means of a die member having substantial force component in the plane of said toe portion and against the end of said toe portion most remote from said gripper die structure, the force of said die member being of a magnitude sufficient to upset said toe portion so as to form a substantially right angle bend in said cutter portion.

References Cited in the file of this patent

UNITED STATES PATENTS

| | | |
|---|---|---|
| 2,703,993 | Staggers | Mar. 15, 1955 |
| 2,854,866 | Mall et al. | Oct. 7, 1958 |